United States Patent
Laplace et al.

(10) Patent No.: US 11,113,071 B1
(45) Date of Patent: Sep. 7, 2021

(54) UNIFIED HYPERVISOR IMAGE FOR MULTIPLE PROCESSOR ISAS

(71) Applicant: VMware, Inc., Palo Alto, CA (US)

(72) Inventors: Cyprien Laplace, Boston, MA (US); Andrei Warkentin, Cambridge, MA (US); Shruthi Muralidhara Hiriyuru, Medford, MA (US); Ye Li, Cambridge, MA (US); Alexander Fainkichen, Southborough, MA (US); Regis Duchesne, Monts-de-Corsier (CH); Sunil Kumar Kotian, San Jose, CA (US); Renaud Benjamin Voltz, Los Altos Hills, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/935,903

(22) Filed: Jul. 22, 2020

(51) Int. Cl.
*G06F 9/44* (2018.01)
*G06F 9/4401* (2018.01)
*G06F 8/61* (2018.01)

(52) U.S. Cl.
CPC ............... *G06F 9/441* (2013.01); *G06F 8/63* (2013.01); *G06F 9/4411* (2013.01); *G06F 9/4416* (2013.01)

(58) Field of Classification Search
CPC .................................. G06F 8/63; G06F 9/441
See application file for complete search history.

(56) References Cited

U.S. PATENT DOCUMENTS

| | | | |
|---|---|---|---|
| 10,552,172 B2 | 2/2020 | Li et al. | |
| 2016/0188345 A1* | 6/2016 | Chen ...................... | G06F 9/4403 713/2 |
| 2018/0173529 A1* | 6/2018 | Tamir ..................... | G06F 9/4856 |

OTHER PUBLICATIONS

U.S. Appl. No. 16/519,867, filed Jul. 23, 2019, 30 pages.

\* cited by examiner

*Primary Examiner* — Albert Wang
(74) *Attorney, Agent, or Firm* — Kim & Stewart LLP

(57) ABSTRACT

A method for booting a computer system includes: loading a first stage bootloader of a plurality of first stage bootloaders from a boot image based on a known configuration of the computer system; executing the first stage bootloader to identify a selected bootbank of a plurality of bootbanks in the boot image based on the known configuration of the computer system; executing, by the first stage bootloader, a second stage bootloader from the boot image with an instruction to boot from the selected bootbank; and executing, by the second stage bootloader, a binary file in the selected bootbank.

20 Claims, 4 Drawing Sheets

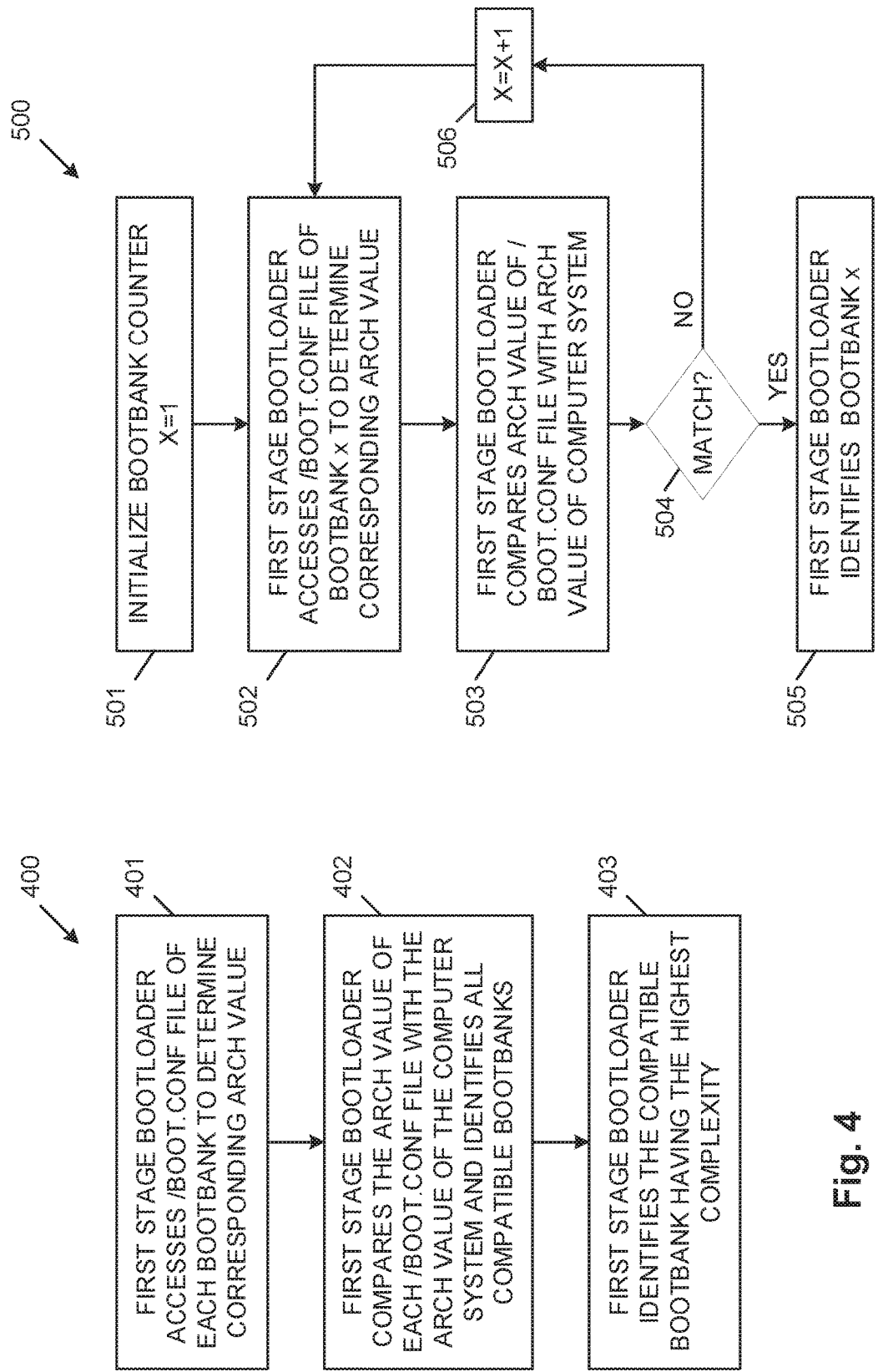

UNIFIED HYPERVISOR IMAGE FOR MULTIPLE PROCESSOR ISAS

BACKGROUND

A computer system may be configured to run a hypervisor, such as VMWare's ESXi™, as system software. The hypervisor can be distributed ready to boot in different disk formats. For example, the hypervisor may be booted from an ISO image (CDROM) or a DD image. Typically, these images can only be booted on a single machine architecture (e.g., a single processor instruction set architecture (ISA)). An image built for a computer system having an x86_64 architecture (an x86_64 machine) cannot be booted on a computer system having an arm64 architecture (an arm64 machine), and vice versa.

This implies that to be able to install or boot a hypervisor image on one particular machine, the administrator must choose the correct hypervisor image for that machine.

However, having to manage multiple images results in integration and maintenance challenges. The problem is even more complicated when an architecture (e.g., arm64) has ISA extensions that require different images.

For example, ARMv8.1 added the 'Virtual Host Extensions' feature (ARMv8.1-VHE) to the ARM architectural reference manual. If a hypervisor (or guest operating system (OS)) is written in a way that makes the 'Virtual Host Extensions' feature a requirement, then the hypervisor (or guest OS) will not be able to boot on a machine that does not implement this feature.

In addition, for ARM platforms, separate hypervisor images need to be booted in exception levels EL1 and EL2, depending on the highest available exception level in which the system boots. That is, different hypervisor images are required depending on whether the hardware platform supports execution of the hypervisor as EL1 or EL2.

It would therefore be desirable to have an improved method for providing appropriate boot images to machines having different ISAs and hardware platforms.

SUMMARY

Accordingly, one or more embodiments provide a method for booting a computer system including: loading a first stage bootloader of a plurality of first stage bootloaders from a boot image based on a known configuration of the computer system; executing the first stage bootloader to identify a selected bootbank of a plurality of bootbanks in the boot image based on the known configuration of the computer system; executing, by the first stage bootloader, a second stage bootloader from the boot image with an instruction to boot from the selected bootbank; and executing, by the second stage bootloader, a binary file in the selected bootbank.

Further embodiments include, without limitation, a non-transitory computer-readable storage medium that includes instructions for a processor to carry out the above method, and a computer system that includes a processor programmed to carry out the above method.

BRIEF DESCRIPTION OF THE DRAWINGS

FIG. 4 is a flow diagram illustrating a method for selecting one of the bootbanks of the boot image of FIG. 3 for download in accordance with one embodiment.

FIG. 5 is a flow diagram illustrating a method for selecting one of the bootbanks of the boot image of FIG. 3 for download in accordance with an alternate embodiment.

DETAILED DESCRIPTION

In general, one or more embodiments provide a 'compound' boot image, including one set of binaries (bootbank) for each supported computer system architecture. Firmware of the computer system loads a first stage bootloader of a plurality of bootloaders from the compound boot image based on a known computer system architecture. The first stage bootloader identifies a bootbank of a plurality of bootbanks from the compound boot image, based on the known computer system architecture. The first stage bootloader retrieves a second stage bootloader from the boot image and instructs the second stage bootloader to boot from the selected bootbank to boot the computer system.

Figure 1:
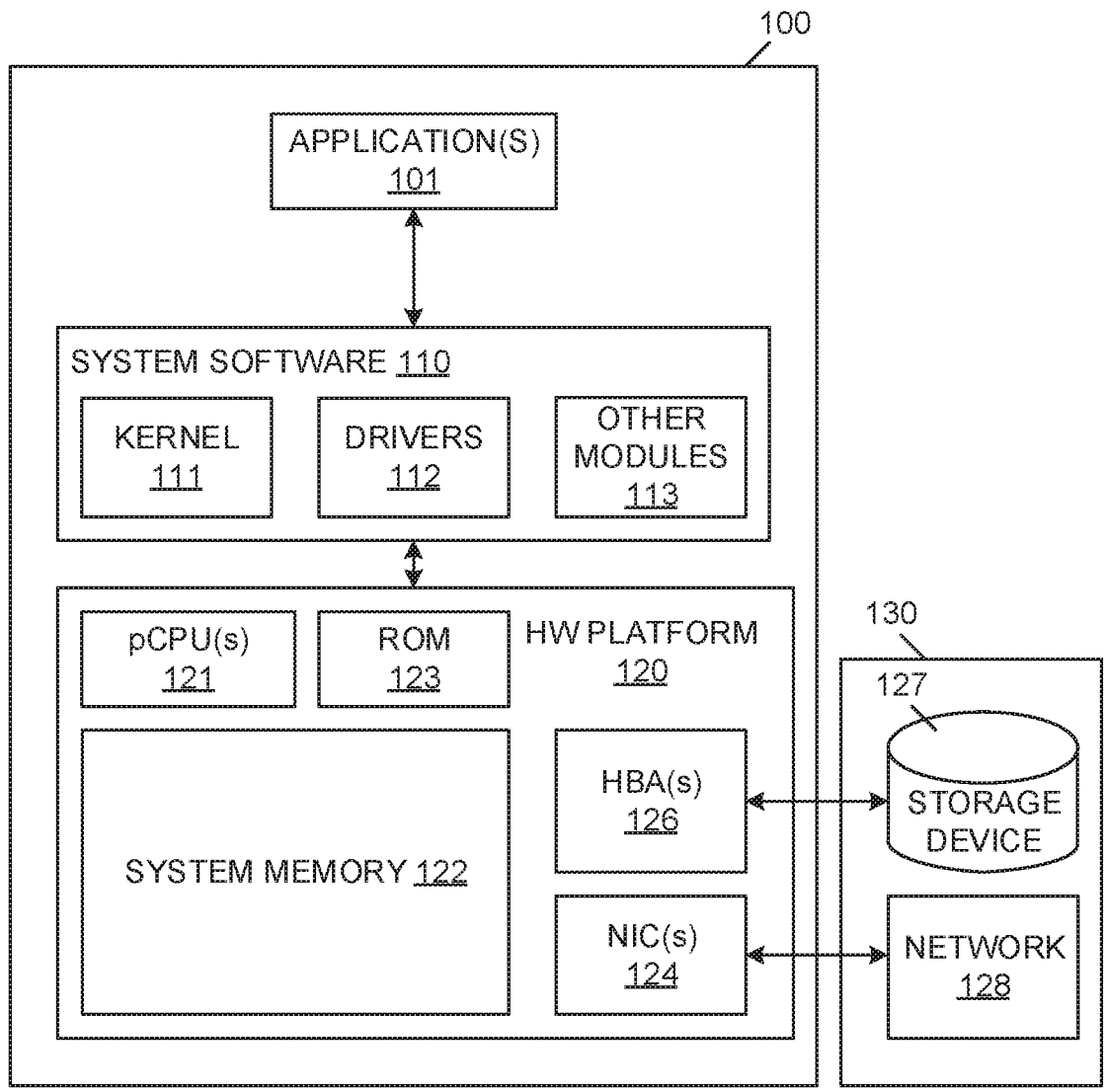
FIG. 1 is a block diagram of a computer system in which one or more embodiments may be implemented.

FIG. 1 is a block diagram of a computer system 100 in which one or more embodiments may be implemented. Computer system 100 includes one or more applications 101 that are running on top of system software 110. System software 110 includes a kernel 111 (also referred to herein as "system software kernel"), drivers 112 and other modules 113 that manage hardware resources provided by a hardware platform 120. In one embodiment, system software 110 is an operating system (OS), such as operating systems that are commercially available. In another embodiment, system software 110 is a hypervisor that supports virtual machines running thereon, e.g., a hypervisor that is included as a component of VMware's vSphere® product, which is commercially available from VMware, Inc. of Palo Alto, Calif. Hardware platform 120 includes one or more physical central processing units (pCPUs) 121, system memory 122 (e.g., dynamic random access memory (DRAM)), read-only-memory (ROM) 123, one or more network interface cards (NICs) 124 that connect computer system 100 to a network 128, and one or more host bus adapters (HBAs) 126 that connect to storage device(s) 127, which may be a local storage device or provided on a storage area network. In general, storage device(s) 127 and network 128 are considered as external storage 130, which stores a compound boot image (described below) used to configure computer system 100. In one embodiment, storage device 127 is a CDROM that stores the compound boot image. In another embodiment, network 128 or storage device 127 stores a DD compound boot image. In the descriptions that follow, pCPU denotes either a processor core, or a logical processor of a multi-threaded physical processor or processor core if multi-threading is enabled.

In the embodiments described herein, computer system 100 has a particular architecture, which includes either an x86_64 architecture, or an arm64 architecture. If computer system 100 has an arm64 architecture, this architecture can include features of the various versions, e.g., ARMv8.0 to ARMv8.6.

In the embodiments illustrated herein, computer system 100 is configured in accordance with the unified extensible firmware interface (UEFI) specification. Computer system 100 is booted from a boot image retrieved from the external storage 130, in accordance with boot firmware stored in ROM 123. In accordance with one embodiment, a first stage bootloader in the boot image determines an architecture identifier variable (Arch) from supported features of computer system 100. The first stage bootloader can determine the supported features of computer system 100 by reading CPU system registers, reading system-on-chip (SoC) identification information from firmware(s), or the like, or a combination thereof. The architecture identifier specifies the particular architecture to be implemented by computer system. Table 1 below provides Arch values assigned to different computer system architectures in accordance with one embodiment. It is understood that other computer system architectures can be represented by other Arch values in other embodiments.

TABLE 1

| Arch value | Architecture |
| --- | --- |
| x86_64 | x86_64 |
| armv86 | ARMv8.6 |
| armv85 | ARMv8.5 |
| armv84-el2 | ARMv8.4-Exception Level 2 |
| armv84-el1 | ARMv8.4-Exception Level 1 |
| armv83 | ARMv8.3 |
| armNeoN1 | ARM Neoverse N1 |
| armv82 | ARMv8.2 |
| armv8-foobarbaz | ARMv8-foobarbaz |
| armv81 | ARMv8.1 |
| armv8 | ARMv8.0 |

Thus, in the example of Table 1, an Arch value of x86_64 indicates that the computer system 100 implements an x86_64 architecture, an Arch value of armv86 indicates the computer system 100 implements an ARMv8.6 architecture, an Arch value of armv84-el 1 indicates the computer system 100 implements an ARMv8.4 architecture and the bootloader executes in exception level 1 only, an Arch value of armNeoN1 indicates the computer system 100 implements an ARM Neoverse N1 architecture, and an Arch value of armv8-foobarbaz indicates the computer system 100 implements an architecture that that requires the VHE feature from ARMv8.1, nested virtualization from ARMv8.4, and 64k pages from ARMv8.0. Table 1 lists the various arm64 architectures in order of decreasing complexity.

During booting, the platform boot firmware stored in ROM 123 carries out the functions of initializing and testing the various hardware devices, RAM, interrupts, DMA, chipsets, and PCI devices and controllers for correct operation.

Figure 2:
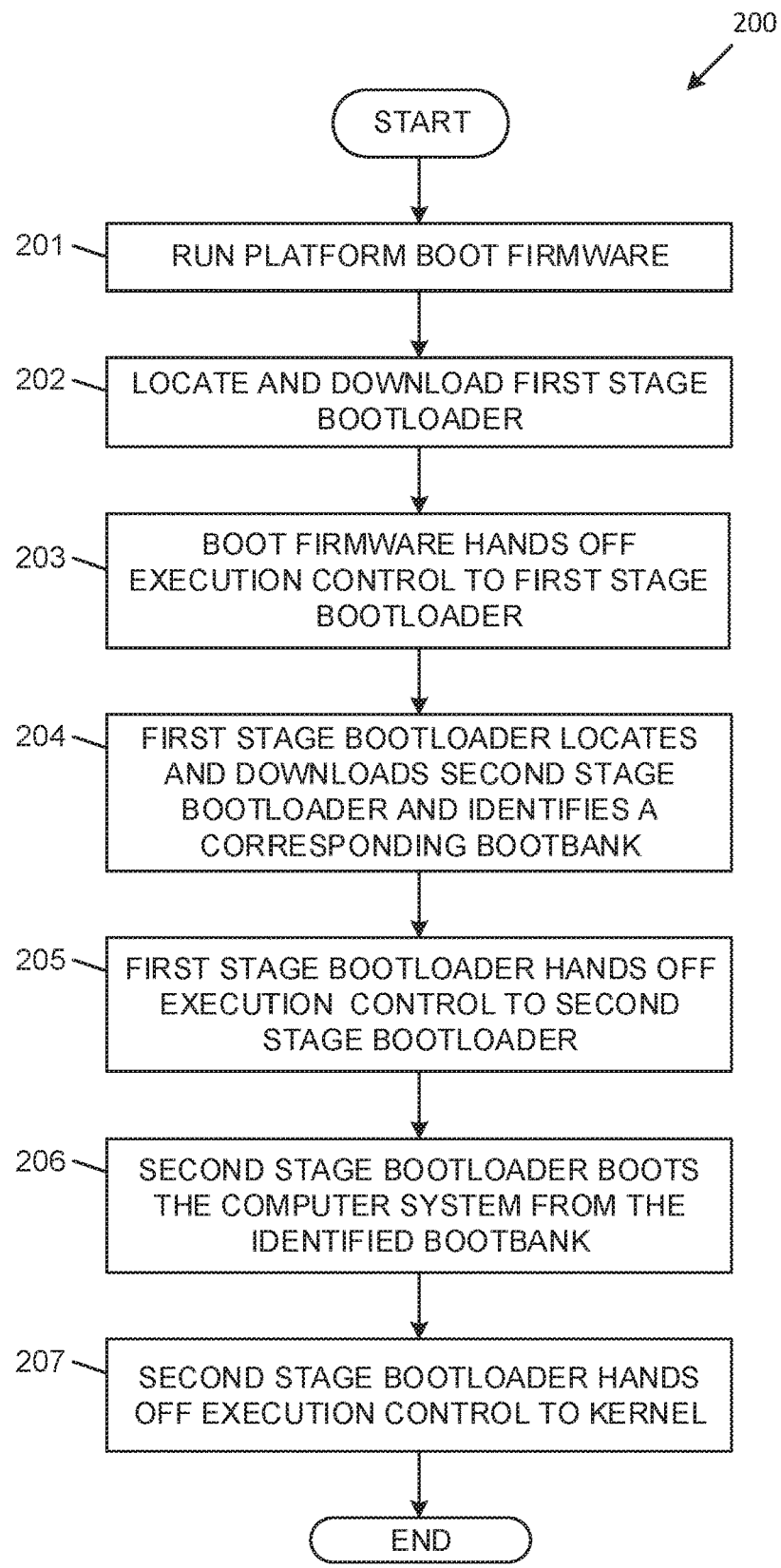
FIG. 2 is a flow diagram of a process for booting a computer system according to one or more embodiments.

FIG. 2 is a flow diagram 200 illustrating the method of a boot process in accordance with one embodiment. One of the pCPUs designated as the boot processer executes, in step 201, the platform boot firmware stored in ROM 123. The platform boot firmware provides two types of services~boot services and run-time services~code and data for which are loaded into system memory 122 and identically mapped to the virtual address space of the platform boot firmware. One of the boot services is power-on self-test (POST), which is carried out at step 201 to confirm that all of the hardware devices are in working order and properly initialized.

In step 202, the platform boot firmware determines the location of a first stage bootloader in a compound boot image stored in external memory 130, retrieves the first stage bootloader from this compound boot image, and loads this first stage bootloader into system memory 122.

Figure 3:
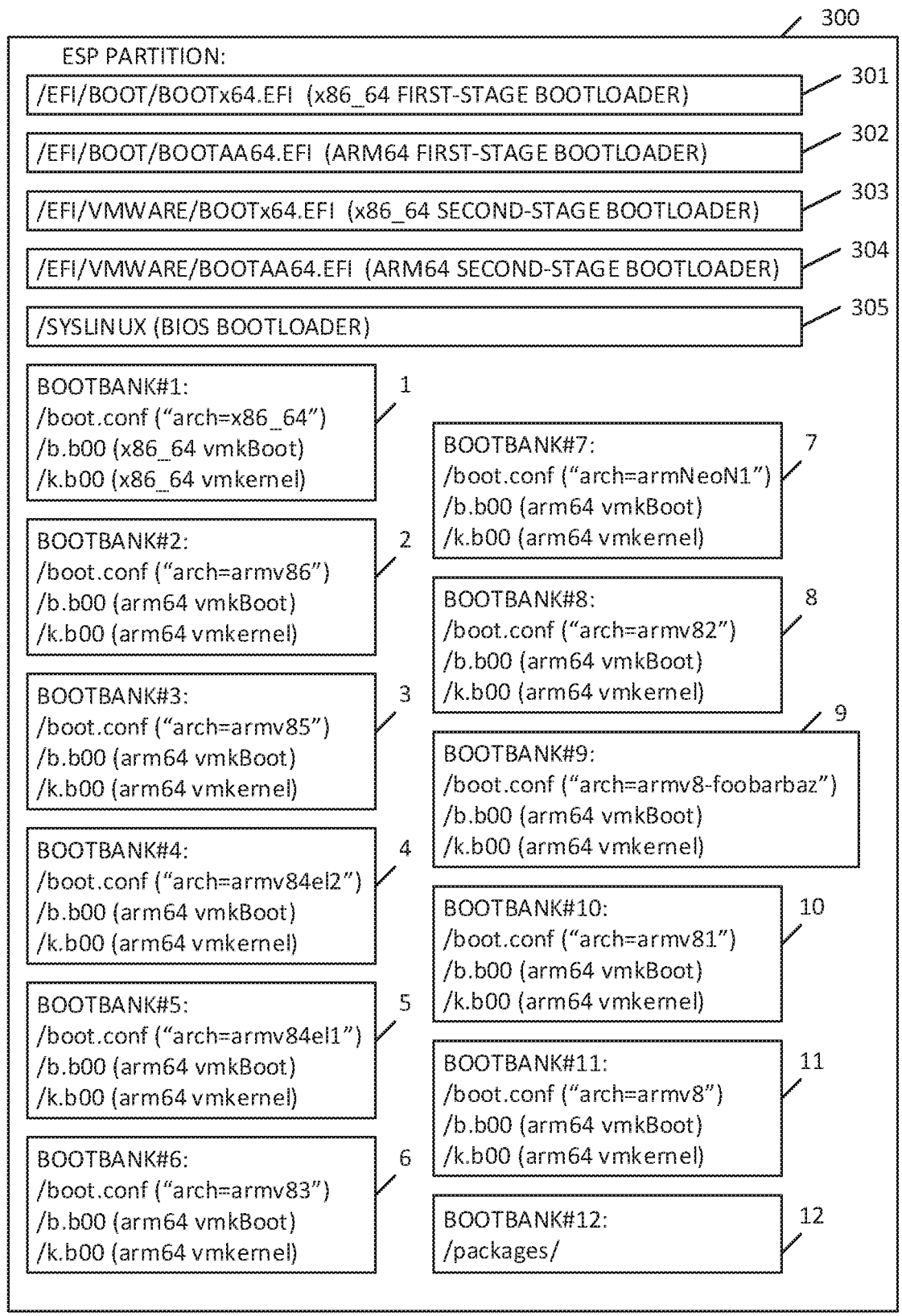
FIG. 3 is a block diagram illustrating a boot image in accordance with one embodiment.

FIG. 3 is a block diagram illustrating the layout of a static compound boot image 300 stored in external memory 130 in accordance with one embodiment. In one embodiment, boot image 300 is a DD image that provides one partition (bootbank) for each supported ISA version, and relies on the first-stage bootloader to select the bootbank corresponding to the machine ISA version. In another embodiment, the boot image 300 is an ISO image that follows UEFI and El Torito specifications, and uses multiple directories (instead of multiple partitions) to store the bootbanks.

In the described example, the computer system 100 is a UEFI-based system. In this embodiment, the boot firmware uses the known architecture of the computer system 100 to retrieve a corresponding UEFI first stage bootloader from boot image 300. More specifically, if the computer system 100 has an x86_64 architecture (i.e., Arch=x86_64), then the boot firmware searches for (and retrieves) a predetermined x86_64-based UEFI first stage bootloader 301, having file name/EFI/BOOT/BOOTx64.EFI, in the boot image 300. Similarly, if the computer system has an arm64 architecture (i.e., the Arch value starts with 'arm'), then the boot firmware searches for (and retrieves) a predetermined arm64-based UEFI first stage bootloader 302, having file name /EFI/BOOT/BOOTAA64.EFI, in the boot image 300. The compound boot image 300 therefore includes a dedicated first stage bootloader for each generally supported architecture.

In step 203, the platform boot firmware hands off execution control to the retrieved UEFI first stage bootloader 301/302.

In step 204, the UEFI first stage bootloader 301/302 locates a corresponding UEFI second stage bootloader in external memory 130, and downloads this second stage bootloader from the external memory 130 into system memory 122. The UEFI first stage bootloader 301/302 also identifies a corresponding bootbank in the compound boot image 300, and instructs the downloaded second stage bootloader to use and load the identified bootbank. As described in more detail below, the second stage bootloader and bootbank are selected in response to the known computer system architecture (Arch value).

More specifically, during step 204, the first stage bootloader 301/302 uses the known architecture of the computer system 100 to retrieve a corresponding second-stage bootloader from boot image 300. More specifically, if the computer system 100 has an x86_64 architecture (i.e., Arch=x86_64), then the first stage bootloader 301 searches for (and downloads) a predetermined x86_64-based UEFI second stage bootloader 303, having file name /EFI/VMWARE/BOOTx64.EFI, in the boot image 300. Similarly, if the computer system has an arm64 architecture (i.e., the Arch value starts with 'arm'), then first stage bootloader 302 searches for (and downloads) a predetermined arm64-based UEFI second stage bootloader 304, having file name/EFI/VMWARE/BOOTAA64.EFI, in the boot image 300. The compound boot image 300 therefore includes a dedicated second stage bootloader for each generally supported architecture.

Also during step 204, the first stage bootloader 301/302 uses the known architecture of the computer system 100 to identify a corresponding bootbank in compound boot image 300. In the illustrated embodiment of FIG. 3, compound boot image 300 includes bootbanks 1-11 (which correspond with the Arch values specified by Table 1). Each of these bootbanks 1-11 includes a searchable /boot.conf file that stores an architecture value (Arch) that identifies a corresponding computer system architecture. For example, bootbank 1 includes a /boot.conf file having an Arch value equal to x86_64, indicating that the bootbank 1 includes modules that are used to boot a computer system having an x86_64 architecture.

Bootbanks 2-11 each include a /boot.conf file having an Arch value that starts with 'arm', indicating that these bootbanks 2-11 include modules that are used to boot a computer system that implements a version of the arm64 architecture. In one embodiment, the bootbanks 2-11 are arranged in a hierarchy such that the Arch values from bootbank 2 to bootbank 11 represent a decreasing complexity in the corresponding computer system architecture. That is, bootbank 2 has an Arch value of armv86', indicating that this bootbank 2 configures the 'most complex' ARMv8.6 computer system architecture, and bootbank 11 has an Arch value of 'armv8', indicating that this bootbank 11 configures the 'least complex' ARMv8.0 computer system architecture. In this context, "more complex" means an ISA supporting more instructions and "less complex" means an ISA supporting less instructions.

Bootbanks 7 and 9 represent hybrid arm64 architectures, wherein bootbank 7 is associated with the ARM Neoverse N1 processor (which is more complex than a ARMv8.2 architecture, but less complex than the ARMv8.3 architecture), and bootbank 9 is associated with an ARMv8-foobarbaz processor (which is more complex than a ARMv8.1 architecture but less complex than the ARMv8.2 architecture).

In the illustrated example of FIG. 3, bootbank 4 is associated with an ARMv8.4 architecture that can only be booted in exception level 2 (as a hypervisor), and bootbank 5 is associated with an ARMv8.4 architecture that can only be booted in exception level 1 (as an OS). Although this distinction is only illustrated in connection with the ARMv8.4 architecture, it is understood that this distinction can be implemented in any of the arm64 architectures in other embodiments.

FIG. 4 is a flow diagram illustrating a method 400 for selecting one of the bootbanks 1-11 of compound boot image 300 in step 204 in accordance with one embodiment. In step 401, the selected first stage bootloader 301/302 accesses the Arch value stored in the /boot.conf file of each of the bootbanks 1-11.

In step 402, the first stage bootloader 301/302 compares the Arch value of the computer system 100 with the retrieved Arch values from the /boot.conf files of bootbanks 1-11 to determine which of the bootbanks 1-11 are compatible with the architecture of computer system 100.

For example, if the computer system 100 has an x86_64 architecture (i.e., Arch=x86_64), then the selected first stage bootloader 301 determines that the architecture of the computer system 100 is only compatible with bootbank 1 (because the Arch value of computer system 100 matches Arch value (Arch=x86_64) stored in the /boot.conf file of bootbank 1).

If the computer system 100 has an ARMv8.3 architecture (i.e., Arch value=armv83), then the selected first stage bootloader 302 determines that bootbanks 6-11 are compatible with the architecture of the computer system 100 (i.e., it is possible to boot the computer system 100 using any one of the bootbanks 6-11, although not all of the features of the ARMv8.3 architecture would be available if computer system 100 is booted from one of the bootbanks 7-11). In one embodiment, the selected first stage bootloader 302 determines that bootbanks 6-11 are compatible with the ARMv8.3 architecture of the computer system 100 by referencing Table 1.

In step 403, the first stage bootloader 301/302 identifies the compatible bootbank associated with the highest computer architecture complexity. For example, if the computer system 100 has an x86_64 architecture (i.e., Arch=x86_64), then the selected first stage bootloader 301 identifies bootbank 1. If the computer system 100 has an ARMv8.3 architecture (i.e., Arch value=armv83), then the selected first stage bootloader 302 identifies bootbank 6 (because the ARMv8.3 architecture of compatible bootbank 6 has a higher complexity than the architectures of the other compatible bootbanks 7-11.)

FIG. 5 is a flow diagram illustrating a method 500 for selecting one of the bootbanks 1-11 for download in step 204 in accordance with an alternate embodiment. In step 501, a bootbank counter value 'x' is initialized to '1'. In step 502, the selected first stage bootloader 301/302 accesses the Arch value stored in the /boot.conf file of the bootbank indicated by the bootbank counter value x (i.e., the Arch value stored in the /boot.conf file of bootbank 1 is initially accessed in step 502). In step 503, the first stage bootloader compares the Arch value of the computer system architecture 100 with the Arch value retrieved in step 502.

In step 504, the first stage bootloader determines whether a match exists between the Arch value of the computer system architecture 100 and the Arch value retrieved in step 502. If a match exists (step 504, YES branch), the first stage bootloader identifies the corresponding bootbank (step 505).

For example, if the computer system 100 has an x86_64 architecture (i.e., Arch=x86_64), then the selected first-stage bootloader 301 determines that the architecture of the computer system 100 matches Arch value (Arch=x86_64) stored in the /boot.conf file of bootbank 1. In this case, the first stage bootloader 301 identifies bootbank 1.

If a match is not detected in step 504 (step 504, NO branch), then the bootbank counter value is incremented by one (step 506), and processing returns to step 502. At this time, the selected first stage bootloader 302 accesses the Arch value stored in the /boot.conf file of the bootbank indicated by the updated bootbank counter value x (i.e., bootbank 2). The process continues in the manner described above, wherein the Arch values of the /boot.conf files of bootbanks 2-11 are sequentially accessed until a match is determined in step 504, and the corresponding bootbank is identified in step 505. The method of flow diagram 500 advantageously minimizes the number of /boot.conf files that must be accessed to identify the bootbank corresponding with the architecture of computer system 100, thereby reducing the time required to complete the boot process of computer system 100.

In the manners described above, only the bootbank matching the architecture of computer system 100 is selected in step 204, and the installation proceeds using this matching bootbank. Any incompatible previous installed the hypervisor/OS image is not upgraded. Rather a clean installation is performed using the matching bootbank. Conventional VMFS upgrade rules are not changed by the embodiments.

Returning now to FIG. 2, after the second stage bootloader has been retrieved from the boot image 300 (Step 205), the first stage bootloader hands off execution control to the retrieved second stage bootloader (step 205).

In step 206, the retrieved second stage bootloader boots the computer system 100 from the identified bootbank, thereby establishing the kernel 111 in system software 110. The identified bootbank can be downloaded from the external memory 130 to the system memory 122 by either the first stage bootloader or the second stage bootloader. The second stage bootloader then hands off execution control to the kernel 111 (step 207). The kernel 111 subsequently accesses bootbank 12 within in the boot image 300, to obtain the binaries required to implement the drivers 112, other modules 113 and applications 101.

Advantageously, the single fixed compound boot image 300 is able to boot machines having a plurality of different computer system architectures (i.e., x86_64 architecture and multiple versions of arm64 architectures), thereby simplifying the configuration process, and eliminating the need to manually select or otherwise determine the proper boot image for a particular machine. For each computer system architecture, only the required first stage bootloader, second stage bootloader and bootbank are used from the compound boot image 300, thereby simplifying the boot process and minimizing the bandwidth and time required to boot the computer system 100. The compound boot image 300 also advantageously allows for booting in a particular exception level. In addition, the compound boot image 300 can be flexibly implemented as either an ISO image or a DD image.

Although the embodiments have been described in accordance with a UEFI-based system, it is understood that the inventive concepts described herein can be similarly applied to a BIOS-based system (wherein the corresponding BIOS bootloader 305 /SYSLINUX is illustrated in FIG. 3).

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

We claim:

1. A method for booting a computer system, comprising:
    loading a first stage bootloader of a plurality of first stage bootloaders from a boot image based on a known configuration of the computer system;
    executing the first stage bootloader to identify a selected bootbank of a plurality of bootbanks in the boot image based on the known configuration of the computer system;
    executing, by the first stage bootloader, a second stage bootloader from the boot image with an instruction to boot from the selected bootbank; and
    executing, by the second stage bootloader, a binary file in the selected bootbank.

2. The method of claim 1, wherein the boot image is a compound boot image, and wherein each of the plurality of bootbanks is associated with a different corresponding computer system configuration.

3. The method of claim 2, wherein each of the plurality of bootbanks includes a corresponding architecture variable that specifies a computer system configuration associated with the bootbank.

4. The method of claim 3, wherein the first stage bootloader identifies the selected bootbank in the boot image by:
    searching the architecture variables of the plurality of bootbanks to identify an architecture variable that specifies a computer system configuration compatible with the known configuration of the computer system.

5. The method of claim 4, wherein the plurality of bootbanks have a hierarchy within the boot image based on complexity of the computer system configurations specified by the architecture variables.

6. The method of claim 5, wherein the first stage bootloader identifies the selected bootbank having an architecture variable that specifies a computer system configuration compatible with the known configuration of the computer system, and having the highest complexity within the hierarchy.

7. The method of claim 3, wherein the architecture variable specifies whether the computer system configuration boots in exception level 1 (EL1) or exception level 2 (EL2) of a processor of the computer system.

8. The method of claim 1, wherein the first stage bootloader is loaded by:
  searching the boot image for a first stage bootloader file in response to the computer system having a first known configuration; and
  searching the boot image for another first stage bootloader file in response to the computer system having a second known configuration.

9. The method of claim 8, wherein the first stage bootloader executes the second stage bootloader from the boot image by:
  searching the boot image for a second stage bootloader file in response to the computer system having the first known configuration; and
  searching the boot image for another second stage bootloader file in response to the computer system having the second known configuration.

10. The method of claim 1, wherein the computer system retrieves the boot image from an external memory.

11. A non-transitory computer readable medium comprising instructions for booting a computer system, wherein the instructions, when executed by the computer system, cause the computer system to:
  load a first stage bootloader of a plurality of first stage bootloaders from a boot image based on a known configuration of the computer system;
  execute the first stage bootloader to identify a selected bootbank of a plurality of bootbanks in the boot image based on the known configuration of the computer system;
  execute, by the first stage bootloader, a second stage bootloader from the boot image with an instruction to boot from the selected bootbank; and
    execute, by the second stage bootloader, a binary file in the selected bootbank.

12. The non-transitory computer readable medium of claim 11, wherein the boot image is a compound boot image, and wherein each of the plurality of bootbanks is associated with a different corresponding computer system configuration.

13. The non-transitory computer readable medium of claim 12, wherein each of the plurality of bootbanks includes a corresponding architecture variable that specifies a computer system configuration associated with the bootbank.

14. The non-transitory computer readable medium of claim 13, wherein the first stage bootloader identifies the selected bootbank in the boot image by searching the architecture variables of the plurality of bootbanks to identify an architecture variable that specifies a computer system configuration compatible with the known configuration of the computer system.

15. The non-transitory computer readable medium of claim 13, wherein the architecture variable specifies whether the computer system configuration boots in exception level 1 (EL1) or exception level 2 (EL2) of a processor of the computer system.

16. A computer system, comprising:
  a system memory; and
  a processor configured to carry out the steps of:
    loading a first stage bootloader of a plurality of first stage bootloaders from a boot image based on a known configuration of the computer system;
    executing the first stage bootloader to identify a selected bootbank of a plurality of bootbanks in the boot image based on the known configuration of the computer system;
    executing, by the first stage bootloader, a second stage bootloader from the boot image with an instruction to boot from the selected bootbank; and
    executing, by the second stage bootloader, a binary file in the selected bootbank.

17. The computer system of claim 16, wherein the boot image is a compound boot image, and wherein each of the plurality of bootbanks is associated with a different corresponding computer system configuration.

18. The computer system of claim 17, wherein each of the plurality of bootbanks includes a corresponding architecture variable that specifies a computer system configuration associated with the bootbank.

19. The computer system of claim 18, wherein the first stage bootloader identifies the selected bootbank in the boot image by searching the architecture variables of the plurality of bootbanks to identify an architecture variable that specifies a computer system configuration compatible with the known configuration of the computer system.

20. The computer system of claim 18, wherein the architecture variable specifies whether the computer system configuration boots in exception level 1 (EL1) or exception level 2 (EL2) of the processor of the computer system.

* * * * *